US006856811B2

(12) United States Patent
Burdue et al.

(10) Patent No.: US 6,856,811 B2
(45) Date of Patent: Feb. 15, 2005

(54) AUTONOMOUS PORTABLE COMMUNICATION NETWORK

(75) Inventors: Warren L. Burdue, 17155 S. Pacific Ave., Sunset Beach, CA (US) 90742-0443; William Stahley, Tustin, CA (US)

(73) Assignee: Warren L. Burdue, Sunset Beach, CA (US)

( * ) Notice: Subject to any disclaimer, the term of this patent is extended or adjusted under 35 U.S.C. 154(b) by 434 days.

(21) Appl. No.: 10/061,386

(22) Filed: Feb. 1, 2002

(65) Prior Publication Data

US 2003/0148778 A1 Aug. 7, 2003

(51) Int. Cl.[7] .............................................. H04M 1/00
(52) U.S. Cl. ...................... 455/517; 455/525; 455/509; 455/575; 455/502; 455/92; 455/465
(58) Field of Search ................................ 455/517, 509, 455/515, 88, 92, 465

(56) References Cited

U.S. PATENT DOCUMENTS

| | | | |
|---|---|---|---|
| 6,314,300 B1 * | 11/2001 | Nakashima et al. | 455/517 |
| 6,532,369 B1 * | 3/2003 | Myer | 455/517 |
| 2002/0019244 A1 * | 2/2002 | Bradley et al. | 455/517 |
| 2003/0078062 A1 * | 4/2003 | Burr | 455/502 |
| 2003/0157963 A1 * | 8/2003 | Collot | 455/557 |

* cited by examiner

Primary Examiner—Nick Corsaro
Assistant Examiner—Alan T. Gantt
(74) Attorney, Agent, or Firm—Gene Scott; Patent Law & Venture Group

(57) ABSTRACT

A portable communication network comprises plural portable communications units, each providing a unit code identifier, a wave energy transceiver, preferably using RF energy which is enabled for direct communication with any other of the communications units over a limited range, a device for assigning a target code to each signal transmission, a device for detecting the target code in each signal reception, a device for processing a received signal when the target code of the received signal equals the unit code, and a device for retransmitting a received signal when the target code of the received signal differs from the unit code. In this manner, through signal repeating, communication is enabled between any two of the communications units when their separation is greater then the limited range. Automatic routing through the communication network is established between two members of the network. Alternate routes are established as background tasks to be switched in if the current route is interrupted.

5 Claims, 5 Drawing Sheets

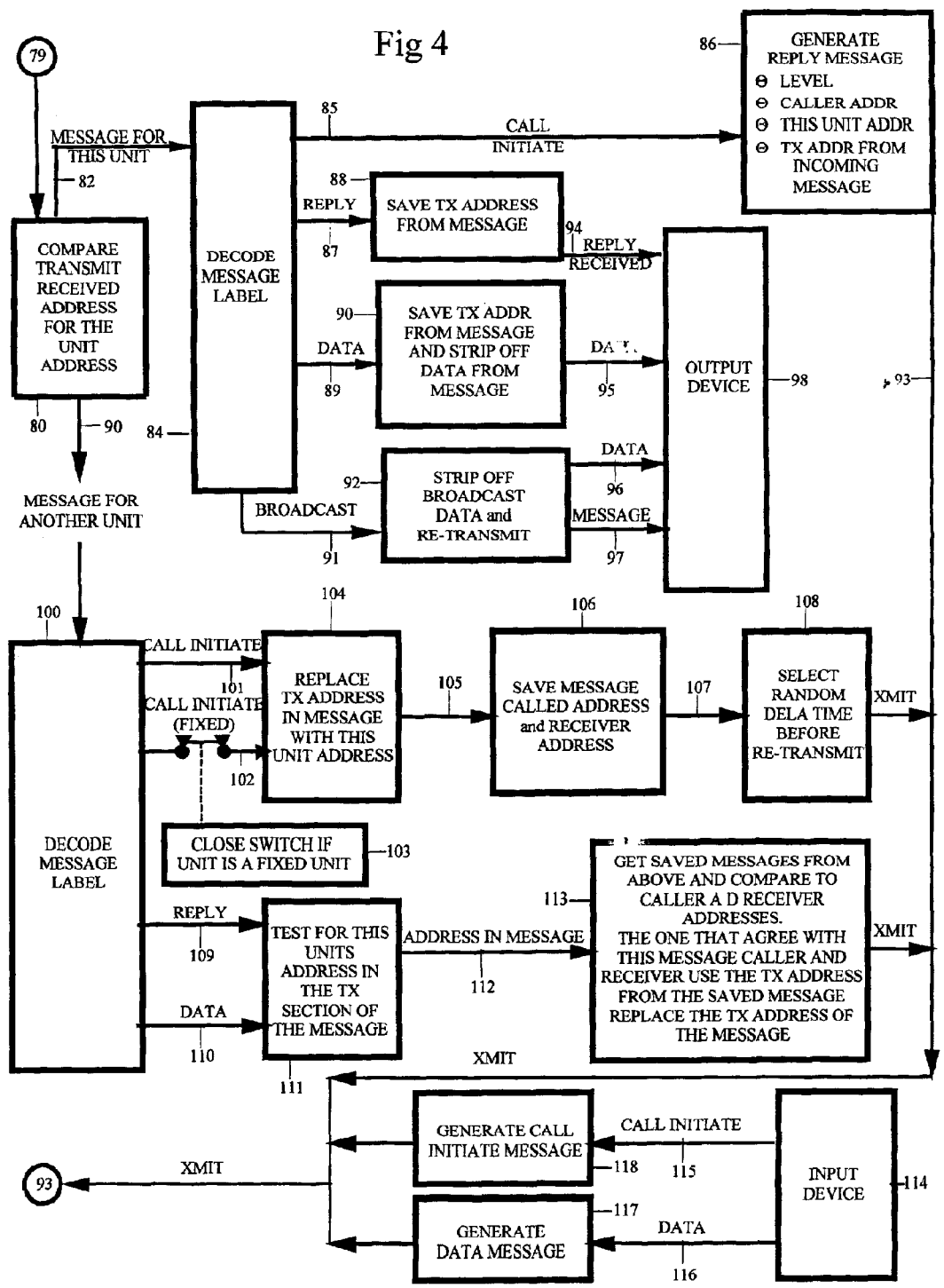

Fig 5 MESSAGE FORMATS

A. CALL INITIATE (FIXED UNIT ONLY RESPOND)

| FIXED UNIT LABEL | ADDRESS OF CALLED | ADDRESS OF CALLED UNIT | ADDRESS OF TRANSMITTER UNIT | FEC |
|---|---|---|---|---|

B. CALL INITIATE (ALL UNITS RESPOND)

| ALL UNITS LABEL | ADDRESS OF CALLED | ADDRESS OF CALLED UNIT | ADDRESS OF TRANSMITTER UNIT | FEC |
|---|---|---|---|---|

C. RE-TRANSMIT MESSAGE

| (SAME) (LABEL) | ADDRESS OF CALLER | ADDRESS OF CALLED UNIT | ADDRESS OF TRANSMITTER UNIT | •••• | FEC |
|---|---|---|---|---|---|

D. DATA MESSAGE

| DATA CABLE | ADDRESS OF CALLER | ADDRESS OF CALLED UNIT | ADDRESS OF TRANSMITTER UNIT | DATA •••• | FEC |
|---|---|---|---|---|---|

E. BROADCAST MESSAGE

| BROADCAST LABEL | ADDRESS OF CALLER | ALL UNITS CODE | DATA •••• | FEC |
|---|---|---|---|---|

F. ALTERNATE PATH SEARCH

| ALT PATH LABEL | ADDRESS OF CALLER | ALL UNITS CODE | ADDRESS OF TRANSMITTER UNIT | FEC |
|---|---|---|---|---|

G. REPLY MESSAGE

| REPLY LABEL | ADDRESS OF CALLER | ADDRESS OF CALLED UNITS | ADDRESS OF TRANSMITTER UNIT | FEC |
|---|---|---|---|---|

AUTONOMOUS PORTABLE COMMUNICATION NETWORK

BACKGROUND OF THE INVENTION

1. Field of the Invention

The present invention relates to portable communications networks and systems, and more particularly to such a network where individual units are enabled for direct communication with each other and for acting as automatic repeaters for other units in communication.

2. Description of Related Art

The following art defines the present state of this field:

The existing cellular telephone system requires three separate units: multiple mobile cellular phones, multiple cell-sites and a single telephone switching office. The mobile cellular phones are free to move wherever they wish among the various fixed cell-sites. Communication between the mobile units and the cell-sites are via a two-way RF communication data link. The cell-site closest the mobile unit provides the communications with the overall cellular system.

The telephone switching office is connected to all of the cell-sites by either a high-speed telephone wire line or by a fixed microwave data link. Control of all internal switching of calls is provided by the mobile telephone switching office. The telephone switching office also provides the coordination of all switching functions. This includes the connections of the cellular system to the nation-wide wire line telephone network.

Each cell-site manages data communication between the mobile units and the mobile telephone switching office. A single cell-site covers a particular geographical area and has the ability to provide a rough location of each mobile unit within its area.

A simple, low cost mobile unit that can incorporate all of the functions of the expensive cell-sites and telephone switching offices is highly desirable.

The prior art teaches the use of portable two-way radio communication but does not teach an automated network of portable units programmed to act as repeater stations as well as personal communicators in establishing a range of communications possibilities much greater then the range of individual units. The present invention fulfills these needs and provides further related advantages as described in the following summary.

SUMMARY OF THE INVENTION

The present invention teaches certain benefits in construction and use which give rise to the objectives described below.

A system of individual portable RF units that structure their own network. A unit may or may not interconnect to other multi-media networks for communications and location between RF unit-members and non-unit-members. Each unit has an "inherent-mode" and an "external-mode" for routing and forwarding calls not addressed to it. An "inherent-mode" enables a unit to operate when not connected to another media network and routs information only within the RF network. An "external-mode" enables a unit to operate when connected to another media network. This enables information to be routed inside and outside the RF network, providing seamless integration between the RF network and various multi-media networks. Also, the "external-mode" provide the means for the RF network and the connected network to relieve each others' congestion or failure. In addition, each unit has as a "fixed-mode" and "remote-mode" of operation. A "fixed-mode" is initiated when a unit is connected to a specific geographical location. Otherwise the unit operates in the "remote-mode". In the "fixed-mode", units have an earth's position of latitude, longitude and altitude available for transfer to other's unit. This enables any unit to determine its relative position within the network by means of triangulation to several units' specific geographical locations and maintain an accurate earth's position.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings:

FIG. 4 is an electronic block diagram of a preferred example of an electronic embodiment of the data processing section of the portable RF unit for network use in accordance with this invention.

FIG. 5 is the various data formats for messages transferred between units within the preferred embodiment of the portable RF unit for network use in accordance with this invention.

DETAILED DESCRIPTION OF THE INVENTION

The above described drawing figures illustrate the invention in at least one of its preferred embodiments, which is further defined in detail in the following description.

Figure 1:
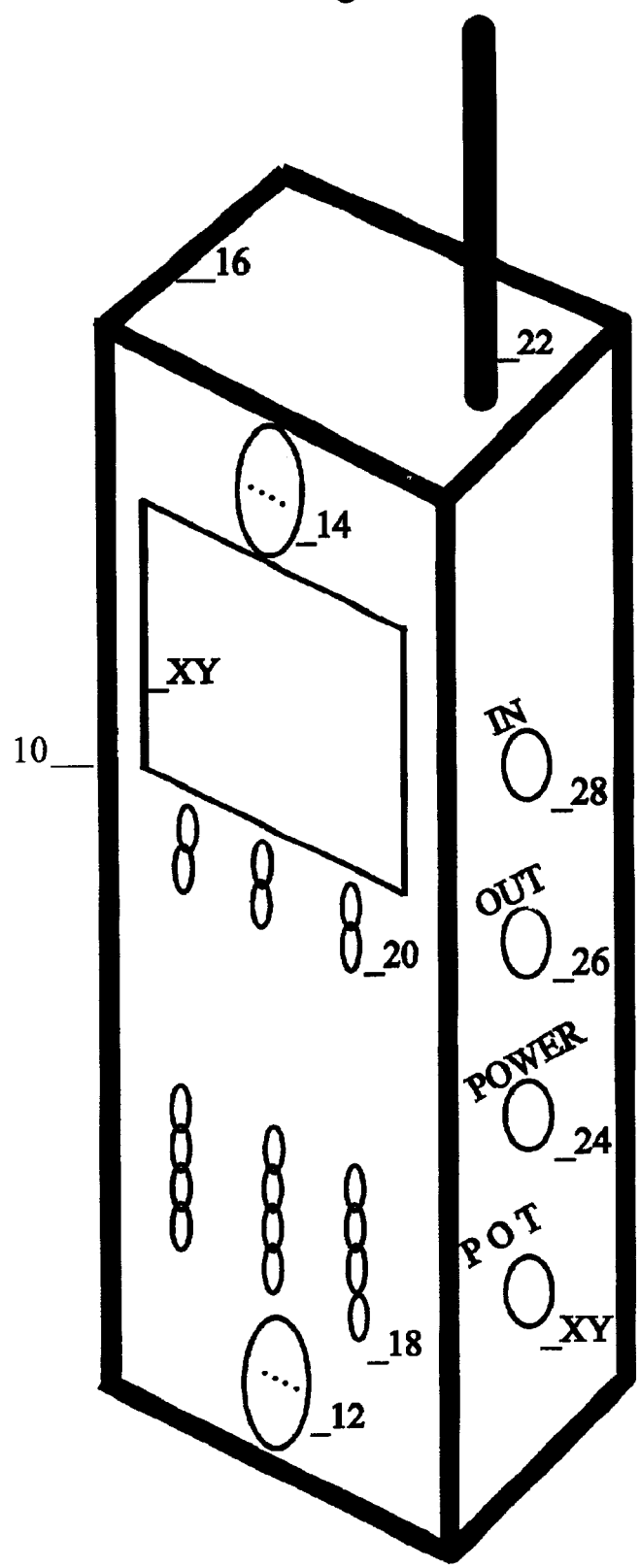
FIG. 1 is an external view of one communications unit of the invention.

FIG. 1 shows external features of one of the portable communication units of the present invention. Unit 10 is typical of a plurality of identical units. It is preferably the size of a hand-held device and configured in size so that it can be positioned adjacent to both the mouth and the ear so that microphone 12 may pick up speech and other sounds, while speaker 14 delivers sound to the user's ear. The housing 16 of the unit 10 may have a plurality of key inputs, such as twelve key input buttons 18 and may have a series of function buttons 20. The housing contains a two-way communications means such as a radio, and thus has an antenna 22 for wave energy coupling. While the unit 10 contains batteries and is preferably hand-portable, it may also be provided with a power input jack 24 for supplemental power input for battery charging and/or for powering the electronics in the unit when the unit is positioned near an external power supply. In addition, the unit has data input and output jacks 26 and 28 for the transmission (TX) and receiving (RX) of data other than purely audio data. A standard telephone land line connection 28A is provided to allow communication via a standard telephone network.

Figure 2:
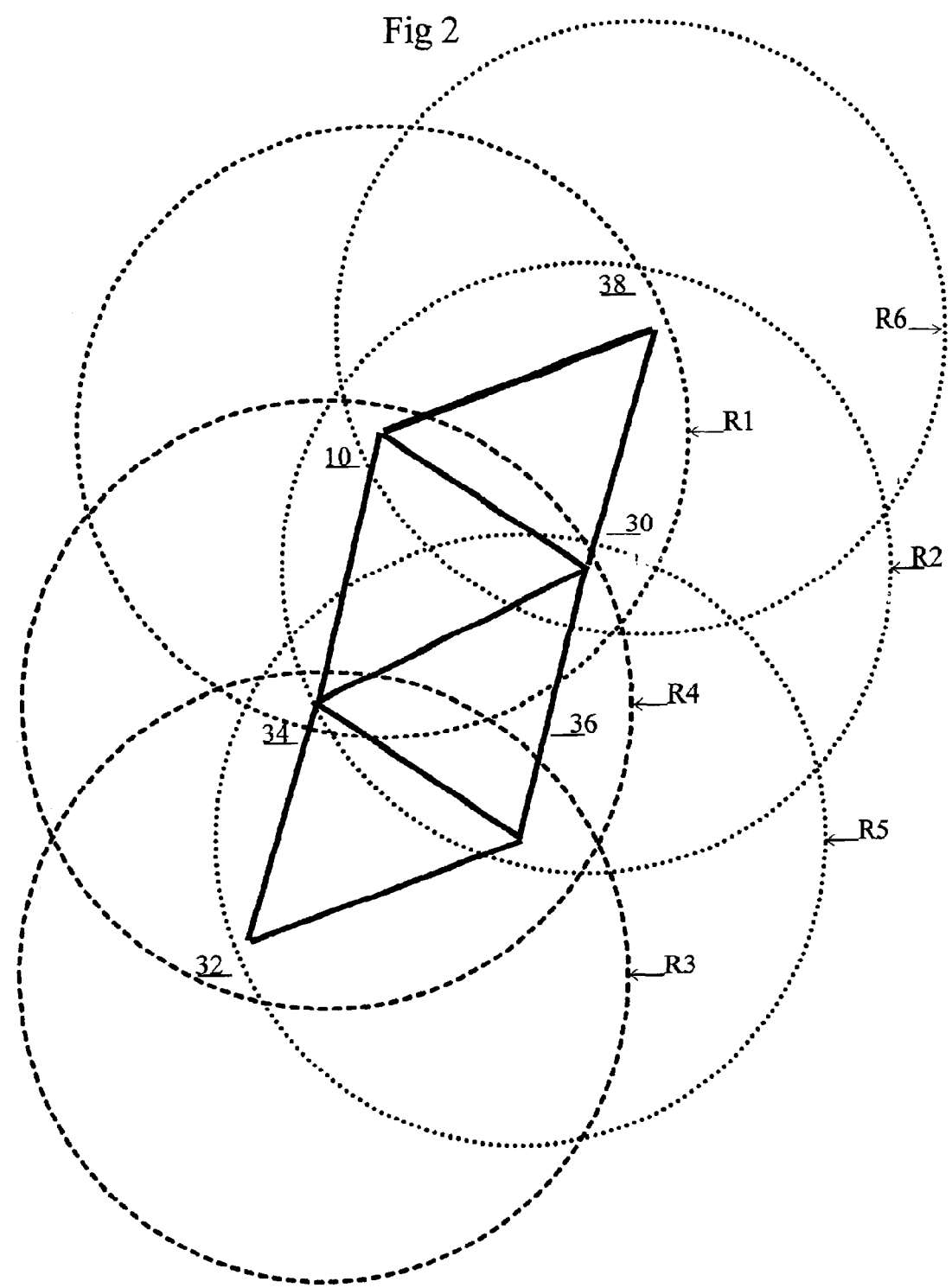
FIG. 2 is a geographical plan view of an example of an arrangement of six of the communications units in network communication.

FIG. 2 shows unit 10 as a first unit in a network. The second unit is shown at 30; the third unit is shown at 32; the fourth unit is shown at 34; the fifth unit is shown at 36; and the sixth unit is shown at 38. The distribution of the units in FIG. 2 is an example of the manner in which they may be distributed with respect to each other during use. It is merely an example to illustrate the different modes of operation. Each of the units has a maximum radius of useful range. The dashed line arcs indicate the useful range or radius of each of the units and illustrates how the network ranges overlap. Each of the units has a unique address with respect to other units in the network.

Figure 3:
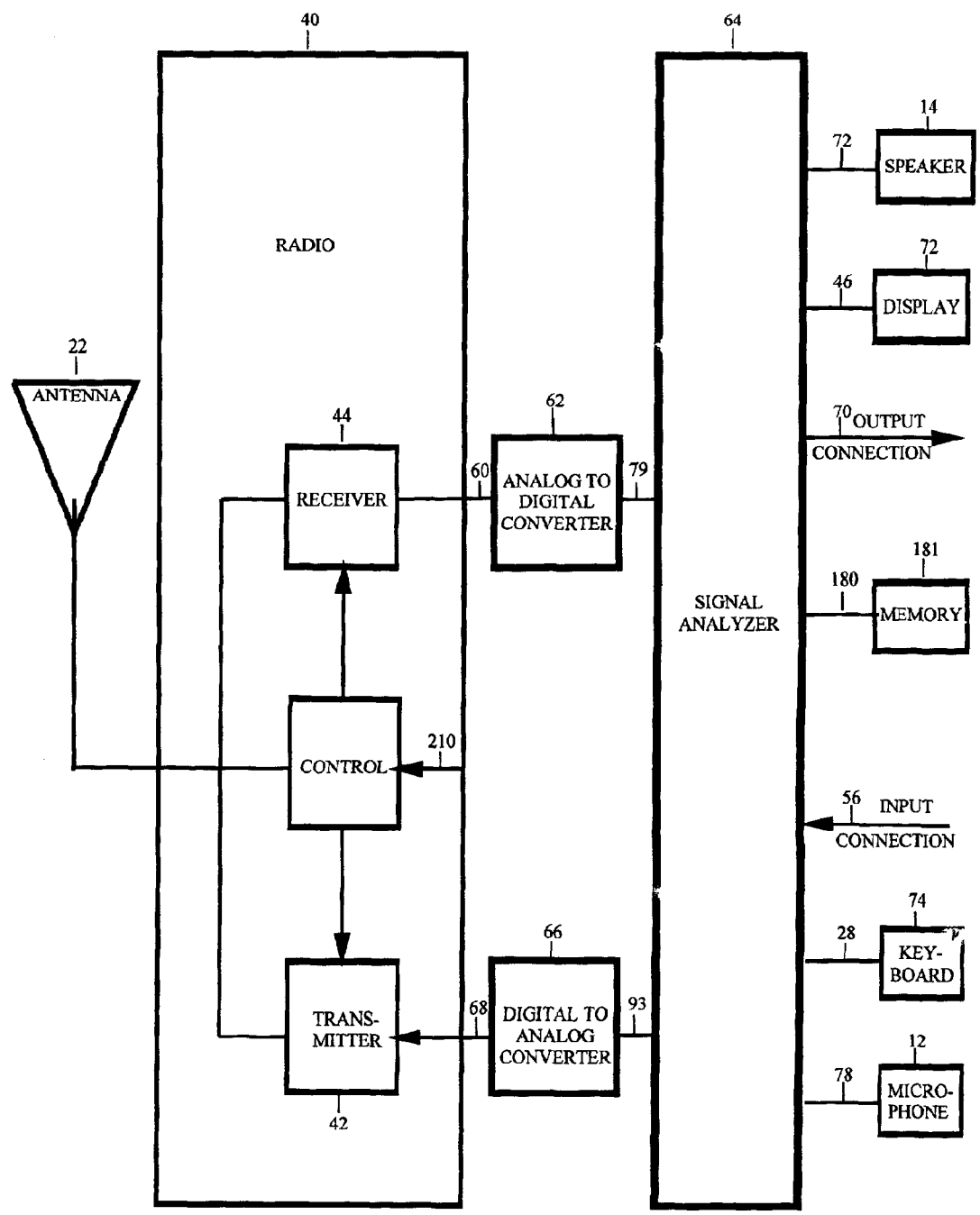
FIG. 3 is an electronic block diagram of a preferred example of an electronic embodiment of the portable RF unit for network use in accordance with this invention.

Referring to FIG. 3, we show a block diagram of a two-way radio generally indicated at 40. The radio 40 is comprised of a transmitter 42 and a receiver 44. The radio may be of any of the standard types such as AM, FM, Bluetooth, etc., using any of the various modulation schemes (CDMA.TDMA, etc.). Generally, the present invention covers any signaling means using wave energy. Incoming RF signals are received on antenna 22 and passed to the receiver 44. The receiver separates the signal from the RF carrier and outputs the analog signal 60. This signal is converted to a digital signal via the analog to digital converter 62 and passed this digital signal 79 to the signal analyzer 64 for processing by digital means. The signal analyzer section 64 will be described in more detail below.

As indicated, the signal analyzer section 64 operates in a digital mode so that output signals are output through digital-to-analog converter 66 to line 68. The line 68 is in analog form and serves as the input to transmitter 42. The transmitter 42 generates an RF signal and outputs it to the antenna 22. The signal is thereby transmitted to all receivers in range that receive that frequency.

The signal analyzer 64 outputs data for the display 72 on line 46, the speaker 14 on line 72 and data for external equipment on line 70 to an output connector. Input data enters the signal analyzer either from a keyboard 74, microphone 12 on line 78 or from an input connector on line 56.

The detail description for the signal analyzer section 64 is shown in FIG. 4. The signal analyzer reads and decodes the label on the incoming RF messages and acts accordingly. Each unit within the network (see FIG. 2) has a unique address so that other members of the network can reach the proper destination.

Case I. Repeat Message Not Required

For example, the unit 10, as seen in FIG. 3, has a radius $R_1$ which reaches units 34, 30 and 38. If the source of the signal is unit 38 and its destination is unit 10, the compare transmit received address for this unit address 80 in unit 10, shown in FIG. 2, determines that the signal is local and sends the signal through line 82 to decode message label 84. Since the routing is direct from unit 38 to unit 10, no special route is required. The decode message label 84 determines which of the following messages is received; call initiate, reply data or broadcast. If a call initiate is decoded (shown in FIG. 5A or 5B) the signal is output on line 85 to generate a reply message 86. The generate reply message 86 forms a reply message as shown in FIG. 5G. The reply message is output on line 93 and sent to the digital-to-analog converter 66. If a reply message is decoded (shown in FIG. 5G) the output is on line 87. The save TX address from message 88 saves this part of the received address so it can be attached to future transmissions onto the network. The reply received line 84 indicates to the output device 98 that a connection has been achieved and communication can begin. If a data message is decoded (shown in FIG. 5D) the output is on line 89. The save TX address from message and strip off data from message 90 outputs data to the output device 98 for output to the appropriate device. The saved TX address is saved so it can be attached to future transmissions onto the network. If a broadcast message is decoded (shown in FIG. 5E) the output appears on line 91. The strip-off broadcast data and re-transmit 92 from message and strip-off data from message 90 outputs data to the output device 98 for output to the appropriate device. The saved transmission address is saved so it can be attached to future transmissions through the network.

Case II. Repeat Message Required

If the source of the transmitted signal is unit 32 (FIG. 2) and the destination is unit 10, the direct signal from unit 32 only reaches out to the radius $R_3$ that does not directly reach unit 10. Instead, units 34 and 36 pick up the signal. When the signal arrives, it is compared with the transmit received address for this unit; address 80, it is indicated that the message is for another unit (line 90). The message on line 90 goes to decode message the label and test FEC 100. The decoded messages are call initiate (ALL), call initiate (FIXED), reply and data. If a call initiate (ALL) is decoded (shown in FIG. 5B) the signal is output on line 101 to replace TX address in message with this unit address 104. The replace TX address in message with this unit address 104 forms a reply message as shown in FIG. 5C. The reply message is output on line 105 and sent to save message called address and receiver address 106. The two addresses are saved so they will be available if needed for return path communication. The reply message is passed on line 107 to select random delay time before re-transmit 108. After the random time delay the transmission signal is output on line 93. This signal is sent to the digital to analog converter 66. If a call initiate (FIXED) is decoded (shown in FIG. 5A) the signal is output on line 102. If this unit is in a fixed location, the close switch, if unit is a fixed unit 103 will close the switch in line 102 and send the signal to replace the TX address in the message with this unit address 104. If the unit is not in a fixed location, the switch will be open and the message will be ignored. If the switch is closed the processing will be the same as call initiate (ALL).

If reply and data messages are decoded (shown in FIG. 5G) the output is on line 109 for reply and line 110 for data. The test for this units address in the TX section of the message 111 will look for the message and will ignore the message if it is not present. If the address is present the reply signal will be output on line 112. The saved message from above is compared with caller and receiver addresses until one is found that agrees with this message caller and then the receiver uses the TX address from the save message to replace the TX address of the message 113. After this operation is completed the modified, the message is output on line 93.

Case III. Output Data From Input Source

Data generated within the unit from either voice or digital data input into input device 114 has two outputs. Call initiate line 115 or data line 116. The call initiate signal goes to generate call initiate message 117 and it forms a call initiate message as shown in FIG. 5B on line 93. A data message output on line 116 goes to generate data message 118. A data message format as shown in FIG. 5D is formed and output on line 93. While it is convenient for all of the units to be portable, of course there is the battery power limitation. In a network where at least one of the units can be less portable, it may be located in an office trailer or in a vehicle to operate from local power. Such are considered to be fixed units because of their larger power supply, which does not permit them to be hand-portable. Furthermore, such fixed units can be connected to telephone lines or other fairly fixed data sources and outputs should such be helpful. Also, the fixed units may be accurately located with respect to latitude and longitude should such be helpful for the task at hand.

A "call initiate" message is formed by putting a label to define the message type followed by the address of the unit initiating the call, the address of the destination unit and the address of the unit transmitting the message. Two types of call initiate messages may generated. Always the first message will be directed to fixed units. An attempt will be made to communicate with other members of the network by using only fixed units. This is done to save the remote unit's battery power. If after a period of time, i.e., approximately, one second, a reply is not received from the addressed unit, the second type of call initiate will be sent. This message is the same as the first but with the label changed. The second type message will allow all units (fixed and remote) to respond to the call initiate message. Each unit receiving the "call initiate" message will examine the label on the call initiate message to determine the type of call initiate. A remote unit will ignore the message if it is for fixed units only. If it is a message of the second type, then all units will respond.

When a unit receives a call initiate message and it determines it should respond, it examines the destination address and compares it with its own. If this address section of the message agrees with the address of this unit, it will accept the message and respond as appropriate. If the destination address is for another unit, this unit will act as a repeater for "call initiate" messages addressed to other members of the network. When this occurs, the message will be saved as it is received so that the address information can be used to route reply messages back to the originator. Once the "call initiate" message has been saved, the unit forms a new message by replacing the transmitting address in the message with its own address. The modified message is then retransmitted onto the network. By this method, the message will eventually reach the destination unit. There will be multiple modified messages transmitted throughout the network. The first message reaching the destination will be designated as the path for this communication.

A "call reply" message will be transmitted by the destination unit to indicate that the communication can take place. The address information attached to the "call initiate" messages during the forward transmission will be used to route the reply back to the originating unit. This will establish the data path for further transfer of multimedia data. The repeating function by any unit occurs without its user's knowledge. In the event the user wishes to use his unit while it is being a part of a communication loop, an alternate path has to be established for continuing the data transfer. The initiating call unit will perform a background computation during a communication to establish an alternate path for communication in the event the current path is broken. The alternate path will switch into the loop if at any time the signal becomes too weak or the path interrupted. The alternate path is established by issuing a call initiate message synchronized and time delayed relative to the normal communication message in the primary established path. If an alternate path is not available and the owner wants to use his unit, he will get a busy signal until the existing transmission has completed. If an alternate path is not available and the signal becomes too weak, then the communication loop will be automatically broken.

An example of this communication scheme is shown in the figures. Assume unit 32 wishes to communicate with unit 38 and that the transmission range of unit 32 can only reach units numbers 34 and 36. The call initiate message transmitted by unit 32 is: fixed label, address 32, address 38, address 32. This message indicates that it is a message that is to be responded to by fixed units only. It also indicates that the message is sent by unit 32 to destination unit 38. The fourth element in the message indicates the unit transmitting the message is unit 32.

Assume all units are fixed units at this point. When units numbers 34 and 36 receive this message they examine the label and see they must respond. They then examine the destination address and compare it to their own. Since the destination address is unit 38, this will not agree with their address and they will be required to retransmit the message. Each unit (34 and 36) will save the message they receive from unit 32 and then modify the message before retransmitting. They modify the message by changing the fourth part of the message. Unit 34 changes the message by putting its address in the fourth part of the message. Unit 36 puts its address in the fourth part of the message. Both units retransmit the message with their address in the fourth position.

Unit 34 has a transmission range which reaches back to unit 32 and forward to units numbers 36, 10 and 30. Unit 36 has a range to reach units 32, 34 and 30. When units 32, 34 and 36 receive these new messages, they compare them with the message they have stored and see that is the same with the exception of the fourth field in the message. Each unit, therefore, ignores the message. When unit number 10 receives the message from unit number 34, it will perform the same examination on the message as that described for unit 34. It will store the message as received, replace the fourth field of the message with its address and retransmit. Unit 30 will receive messages from both units 34 and 36. It will perform the same functions on the first message to arrive as described for unit 10. When the second message arrives, it will be ignored since unit 30 has already saved the message with only the fourth field changed. Unit 34 will receive and ignore the message from number 10 and number 30. Unit 36 will receive and ignore the message from unit 30. The messages from units numbers 10 and 30 will both be received by unit 38. The first one arriving at unit 38 will be utilized, and the second one will be rejected. If two signals arrive at one of the units at the same time, both will be rejected and the unit will await the receipt of a clear message, i.e., no interference.

Unit 38 will examine the message and see that it is the addressee. It will respond by generating a "call reply." The "call reply" message is similar to the call initiate message with only the label changed. The fourth field of the call reply message will be the unit address of the unit that is to reply. For example, let's assume that the path for the communication between unit 32 and number 38 is 32 to 34, 34 to 30 and 30 to 38. Unit 38 will reply with the message of: Call reply format, unit initiating the call address, unit destination address, and unit address for repeating the message. In this case, unit 38 will reply with: call reply label, 32, 38, 30. When unit 30 receives this message, it will see this is a call reply message that has its address in the fourth field. It will then change the fourth field to the value 34 and retransmit the message. The value 34 is obtained from the message it received and saved from the call initiate message. When unit 10 receives the message from unit 38, it will note that its address is not in the fourth field and will therefore ignore it. Unit 34 will receive the message from unit 30 and will replace the fourth field with a 32 and retransmit the call reply message thereby establishing the communication path.

Unit 32 will transmit a message that has the following format: "message" label, originating address, destination address, repeater address and message content. The repeater address will be 34. Unit number will receive this message and change the repeater address to 30 and retransmit. Unit 30 will receive this message and change the repeater address to 38 before retransmitting. All units receiving the message that does not have its address in the repeater field will ignore the message.

Communications within the network can only occur within a local area. A local area is defined as the area that has direct communication between adjacent members. Once the distance gets too great, the direct and repeat capabilities are lost. To get around this limitation, interface with other multimedia equipment is provided using the unit. For example, the signals may be routed on public telephone lines for some distance to get to another local area of the system. Once the signal gets into the second local area of the system, it can be brought out into the network using any unit and then be propagated throughout the new local area. Multimedia equipment that provides communication paths other than the telephone can be used to bridge gaps within the system. Interface to other multimedia equipment provides communications worldwide with non-network members. The unit provides a terminal to access, control, route and transfer data throughout the network and over any selected multimedia equipment. Network members within a local area communicate with one another using an RF data link. No interface with any land line is required.

The various portable units and the network are useful in both communication and identification of location between points.

As a portable voice communication network, the input device 12 is a microphone that is energized by a user's voice. The output device 14 is a speaker to translate the signals into audio signals. A number of other different kinds of input devices and output devices are possible and should be considered included within the scope of the invention. The signal analysis section 64 can either use the data locally or pass it on to other units or multimedia. In addition data processing may compress the data before storing the information in memory or transmitting it to other multimedia. Data received from other units or multimedia may require data processing to either store the data in memory or to decompress the information before sending it to external equipment.

The output connection 70 and input connection 56 provides the hardware interface for connecting to various systems. This could be a computer interfacing with a computer network such as the Internet. Both serial and parallel data transfer to and from computers may be used. A Keyboard may be the input device to provide the means for the operator to enter information into the unit. The data entry may be for control of the system or may be data that is to be stored within, transmitted via one of the multimedia channels or transmitted via the wave energy link. Signal analysis section 64 reads the keyboard inputs and interprets the commands and utilizes the keystrokes for generating messages and/or data.

An output display as an output device provides the operator with information needed for operating the system, displaying messages to be sent and/or received. Signal analysis section 64 performs all the formatting of information and control needed to generate the display. An image interface as an input device is the hardware needed to accept image information from any image reading equipment and convert it into a digital signal for storage and/or transmission to another location via the RF link or other multimedia channel. The image interface also converts data for outputting to image display equipment. Signal analysis section 64 can transmit and/or store the data as it is received from the image equipment or may compress it prior to transmission or storage. Image data, being output for a display, will be decompressed by data processing if necessary. This includes data which is stored within the unit and data received over any of the multimedia channels.

The Memory, as an input device provides storage of phone numbers, E-mail messages, paging messages, voicemail, etc. for retrieval by the operator. The data for storage may be generated by the operator or may come to the unit via RF or one of the multimedia channels. The storage in the memory is nonvolatile so that the stored information is not lost if power to the unit is interrupted. Signal analysis section 64 controls the routing of data being stored and retrieval of data from memory. The operator may view any of these data on the display. The operator may also modify and/or erase any of these stored data.

Another feature is the provision of adding position (latitude, longitude and altitude) data to the location where the telephone connection is made. When the telephone connection is made, the actual location of the unit is fixed. The position of this unit can be transmitted to remote units so they may compute their positions via triangulation from multiple units within the network. Range for triangulation computation is obtained from one unit to another by timing the turnaround time between sending a message to another unit and receiving a reply from that unit. The position in latitude and longitude of the interrogated unit is listed in the reply message and includes any fixed time delay within the responding unit. The data message format, as shown in FIG. 5D, is used for the request for range and reply from another unit. Repeated range interrogation is performed every few seconds so that the position of the unit is updated as it moves relative to the surface of the Earth.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A portable communication network comprising: plural portable communications units, each providing: (a) a unit code, (b) a wave energy transceiver enabled for direct communication with any other one of the communications units over a limited range, (c) means for assigning a target code to each signal transmission, (d) means for detecting the target code in each signal reception, (e) means for processing a received signal when the target code of the received signal equals the unit code, and (f) means for retransmitting a received signal when the target code of the received signal differs from the unit code; wherein each one of the units is enabled for measuring a time delay between an interrogation and a reply with another of the units and for sending position information of said one of the units within a reply message, the one of the units enabled further for determining a relative position on the Earth of the one of the units by a triangulation method; whereby, through signal repeating, communication is enabled between any two of the communications units when their separation is greater then the limited range.

2. The portable communication network of claim 1 wherein each of the units further comprises means for assigning route codes to each of the retransmitted received signals.

3. The portable communication network of claim 1 wherein each of the units further comprises means for assigning the unit code to each signal transmission.

4. The network of claim 2 wherein each of the units is further enabled for assigning a selected route code to a transmission subsequent to a previous transmission having the selected route code.

5. The network of claim 1 wherein at least one of the units is further enabled for fixed-wire communication.

* * * * *